No. 812,729. PATENTED FEB. 13, 1906.
J. A. DE VITO.
VARIABLE SPEED DEVICE.
APPLICATION FILED MAY 3, 1905.

WITNESSES
O. T. Palmer
N. Palmer

INVENTOR
JOHN A. DeVITO
BY
ATTY.

UNITED STATES PATENT OFFICE.

JOHN A. DE VITO, OF ROXBURY, MASSACHUSETTS.

VARIABLE-SPEED DEVICE.

No. 812,729.　　　　Specification of Letters Patent.　　　　Patented Feb. 13, 1906.

Application filed May 3, 1905. Serial No. 258,671.

*To all whom it may concern:*

Be it known that I, JOHN A. DE VITO, a citizen of the United States, and a resident of Roxbury, in the county of Suffolk and State of Massachusetts, have invented certain new and useful Improvements in Variable-Speed Devices, of which the following is a specification.

The object of my invention is to produce a variable-speed device which is quick-acting and yet simple in construction.

Heretofore the principal objection in variable-speed devices using a plurality of spur-gears is the great liability of the stripping of the teeth. By keeping the gears always in mesh this objection is overcome in my invention.

Figure 1:
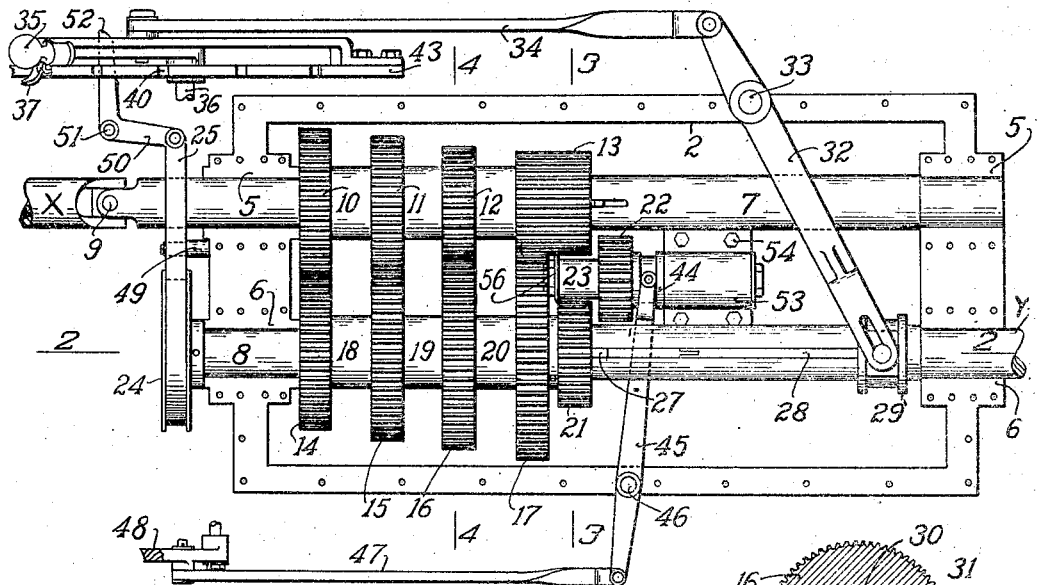
Figure 4:
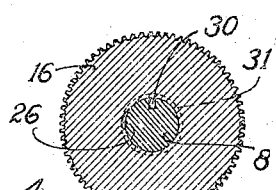
Figure 3:
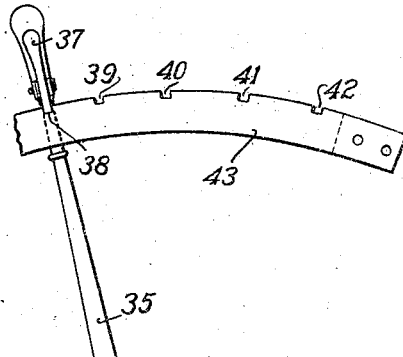
Figure 3:
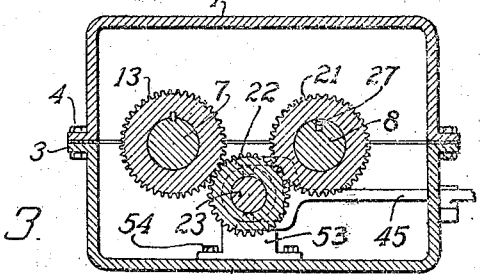
Figure 2:
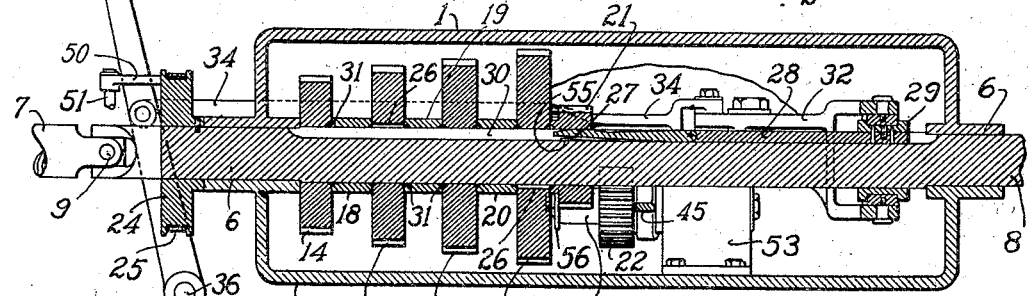

In the drawings, which are somewhat diagrammatical, Figure 1 is a plan view with the upper half of the casing removed. Fig. 2 is a longitudinal section on line 2 2 of Fig. 1. Fig. 3 is a transverse section on line 3 3 of Fig. 1. Fig. 4 is a transverse section of one of my change-gears on line 4 4 of Fig. 1.

1 and 2 are the upper and lower halves, respectively, of the casing inclosing the change-gears. These halves are here shown provided with flanges 3 for the passage of bolts 4 for the purpose of securing the halves together and are provided at their ends with journal-boxes 5 5 and 6 6 for the reception of driving-shaft 7 and driven shaft 8.

X is the power end of driving-shaft 7, and Y is the driven end of the variable-speed or driven shaft 8.

9 is the usual universal joint on the driving-shaft.

Driving-shaft 7 is provided with a plurality of spur-gears 10 11 12 13, rigidly mounted on same and continually in mesh with an equal number of spur-gears 14 15 16 17, loosely mounted upon shaft 8. Gears 14 15 16 17 are separated by collars 18 19 20, which are each a trifle wider than the face of the gears adjacent and are also loosely mounted on shaft 8. Spur-gear 13, engaging spur-gear 17, is made with an extra width of face to afford space for operative engagement of gear 22 therewith when shifted, the latter gear also engaging spur-gear 21, rigidly mounted on shaft 8. Said spur-gear 21 serves as an inclosing collar to hold gears 14, 15, 16, and 17 in place against journal-box 6. Spur-gear 13 engages the idler-gear 22, which is slidably and rotatably mounted upon an auxiliary shaft 23 and through the medium thereof imparts motion to gear 21 when said idler-gear 22 has been shifted.

Upon the outer end of shaft 8 is rigidly mounted a brake-wheel 24, carrying a brake-strap 25, which is operated in a manner to be presently described.

Gears 14 15 16 17 have each a recess 26 cut from side to side at the shaft-bearing, which recess is slightly wider than the head 27 of a jointed key 28, mounted in a shift-collar 29 and playing in groove 30 in shaft 8. These gears 14 15 16 17 and the collars 18 19 20 and the forward edge of gear 21 have minute bevels cut completely around the periphery of the edges of their respective shaft-bearings to facilitate the sliding of key 28. These bevels are shown at 31 in Fig. 2. Engaging shift-collar 29 is a shift-lever 32, pivoted in the casing at 33 and having its opposite end pivotally connected to a bar 34, which in turn is pivotally connected to a hand-lever 35. Hand-lever 35 is pivoted to a suitable frame (not shown) at 36, and its motion is guarded by a spring-catch 37, engaging at different times with notches 38 39 40 41 42 in a sector-arm 43; likewise secured to the frame. Integral with gear 22 is a shift-collar 44, engaged by shift-lever 45 for the purpose of sliding gear 22 upon shaft 23. Lever 45 is pivotally mounted in the casing at 46, and its outer end is pivotally connected to a bar 47, which in turn is pivotally connected to a hand-lever 48. Brake-strap 25 is secured at one end to the casing by means of stud 49, and its opposite end is pivotally secured to a bell-crank lever 50, fulcrumed at 51. The opposite end 52 of lever 50 is in position to be engaged by hand-lever 35 when it is desired to set the brake. Shaft 23 is journaled in box 53, secured to casing 2 by bolts 54.

The operation is as follows: The spur-gears 14 15 16 17, as well as the gears 10 11 12 13, must be of varying sizes, although one pair, as 10 and 14, may be of equal size. In the position shown in Fig. 1 the driven shaft 8 is at rest; but the brake is not set. If it is desired to bring gears 13 and 17 into action, hand-lever 35 is moved backward until spring-catch 37 engages notch 39. This operation throws the key 28 forward until the head 27 is in position to engage slot or recess 26 in gear 17. As gear 17 is constantly revolving, this will occur before one complete revolution has taken place, and then spring 55, assisted by centrifugal force, throws out the head 27 into recess 26 and compels shaft 8 to revolve with gear 17. In like manner the successive notches 40 41 42 will cause engagement of shaft 8 with gears 16 15 14 when spring-clutch 37 engages them. After having engaged successively gears 17 16 15 14 if it is desired to suddenly stop the motion of shaft 8 (in this case from its highest speed) lever 35 is moved forward toward position shown in Fig. 2; but this time instead of dropping spring-catch 37 into notch 38 lever 35 is carried beyond notch 38, engaging the end 52 of bell-crank lever 50 and setting the brake. When shaft 8 is brought to a stop, the lever 35 can then be brought back until catch 37 engages notch 38, as shown. It will be noted as a special feature of my invention that in this quick-stopping action the positions of the recesses 26 in gears 15 16 17 are absolutely immaterial, as the spring 55 will yield sufficiently to permit key 28 to be readily withdrawn without requiring head 27 to retire through these successive recesses. The bevels shown at 31 materially assist this action. In like manner various speeds may be obtained instantly by engagement of the several gears from the position of rest. It will be noticed that it is essential that collars 18 19 20 must be wider than the faces of the adjacent gears to prevent head 27 from engaging two gears simultaneously.

If it is desired to reverse the direction of rotation of shaft 8, first place spring-catch 37 in notch 38 to secure head 27 against engaging any of the gears 14 15 16 17. Then move hand-lever 48 backward, sliding gear 22 forward on shaft 23 against a stop-collar 56 and in mesh with gears 13 and 21. A sector can be provided with suitable notches for locking in the two positions, if desired; but one speed is here shown for the reverse condition—viz., that of the driving-shaft.

It will be understood that a series of concentric bevel-gears can be mounted on the driving-shaft engaging bevel-gears upon a driven shaft to operate shafts whose axes are not parallel without departing from the spirit of my invention.

It is further understood that the method of mounting these gears can be reversed—viz., the rigid gears on the driven shaft and the rotatable gears and sliding key upon the driving-shaft.

What I claim is—

1. In a variable-speed device, a driven shaft; a driving-shaft; a plurality of gears rigidly mounted upon one of said shafts; and an equal number of gears rotatably mounted on the other of said shafts, each of said rotatable gears meshing with a rigid gear; in combination with means for successively causing each pair of meshing gears to rotate the driven shaft, and a brake mechanism cooperative with said means, substantially as set forth.

2. In a variable-speed device, a driven shaft; a driving-shaft; a plurality of gears rigidly mounted upon one of said shafts, one of said gears having an extra wide face; an equal number of gears rotatably mounted upon the other of said shafts, each of said rotatable gears being in mesh with a different rigid gear; a single gear rigidly mounted upon the shaft containing the rotatable gears; an auxiliary shaft, an auxiliary idler-gear slidably and rotatably mounted upon the auxiliary shaft in position to readily engage the rigid gear upon the shaft containing the rotatable gears and the rigid gear with the extra wide face simultaneously; in combination with means for causing each pair of meshing gears, and an auxiliary gear with its two rigid gears to successively impart motion to the driven shaft, substantially as set forth.

3. In a variable-speed device, a rotatable shaft; a plurality of gears rotatably mounted upon said shaft; a key member slidably mounted upon said shaft and adapted to successively lock each of said gears upon said shaft; a brake mechanism for controlling the motion of the latter and means for causing the key to engage successively the different gears, and for actuating the brake mechanism, substantially as set forth.

4. In a variable-speed device, a rotatable shaft, having a longitudinal keyway; a plurality of gears rotatably mounted upon said shaft and each provided with a keyway; a shift-collar slidably mounted upon said shaft; a spring-pressed, jointed key rigidly attached to said collar and adapted to move in the keyway upon said shaft and successively engage the keyways in each of said gears; in combination with means for causing the successive engagement of said key with said keyways in the gears, and mechanism coöperative with said means, for controlling the motion of the rotatable shaft, substantially as set forth.

5. In a variable-speed device, a rotatable shaft provided with a longitudinal keyway; a plurality of gears rotatably mounted upon said shaft, each provided with a keyway; a shift-collar slidably mounted upon said shaft; a spring-pressed, jointed key rigidly attached to said collar and adapted to slide in the keyway on said shaft and successively engage the keyways in said gears; in combination with a shift-lever; and a brake mechanism on said shaft adapted for operation by said shift-lever, substantially as set forth.

In testimony whereof I have affixed my signature in presence of two witnesses.

JOHN A. DE VITO.

Witnesses:
ALBAN ANDRÉN,
A. T. PALMER.